United States Patent [19]

Phillips

[11] Patent Number: 5,653,512
[45] Date of Patent: Aug. 5, 1997

[54] QUICK-RELEASE BICYCLE AXLE FASTENER NUT

[75] Inventor: Cal M. Phillips, Platteville, Wis.

[73] Assignee: S.A.F.E.-Q.R. Corporation, Platteville, Wis.

[21] Appl. No.: 542,065

[22] Filed: Oct. 12, 1995

[51] Int. Cl.⁶ .................................................. B60B 27/00
[52] U.S. Cl. ..................... 301/124.2; 301/110.5
[58] Field of Search .............. 301/56, 59, 110.5, 301/110.6, 124.2; 411/136, 160, 161, 162, 337, 371

[56] References Cited

U.S. PATENT DOCUMENTS

| 2,630,020 | 3/1953 | Juy | 74/242.14 |
|---|---|---|---|
| 3,922,018 | 11/1975 | Shook | 301/105 |
| 4,033,627 | 7/1977 | Morroni | 301/111 |
| 4,079,958 | 3/1978 | Segawa | 280/279 |
| 4,400,038 | 8/1983 | Hosokawa | 301/111 |
| 4,679,862 | 7/1987 | Luo | 301/112 |
| 4,724,692 | 2/1988 | Turin et al. | 70/225 |
| 4,763,957 | 8/1988 | Pochlmann et al. | 301/105 B |
| 4,770,011 | 9/1988 | Constaut | 70/225 |
| 4,789,206 | 12/1988 | Ozaki | 301/111 |
| 4,805,941 | 2/1989 | Downing | 280/279 |
| 4,906,053 | 3/1990 | Kawai | 301/105 B |
| 4,964,287 | 10/1990 | Gaul | 70/233 |
| 5,383,716 | 1/1995 | Stewart et al. | 301/124.2 |

FOREIGN PATENT DOCUMENTS

| 460058 | 10/1950 | Italy . |
|---|---|---|
| 463954 | 2/1952 | Italy . |
| 1441058 | 3/1988 | Italy . |
| 341220 | 1/1931 | United Kingdom . |

Primary Examiner—Russell D. Stormer
Attorney, Agent, or Firm—John V. Stewart

[57] ABSTRACT

A tension adjustment and retention device for a cam/lever quick-release bicycle axle fastener, having a washer (8) that provides two different thicknesses via two alternate rotational positions. When the cam is loose, rotating the washer 90 degrees with the fingers causes a quick change in clearance between the washer and the drop-out, for removal or mounting of the axle. For axle mounting, a pre-set clamping clearance is restored precisely. A safety interlock slide (60) may optionally be added for automatic, undefeatable, secondary engagement between the axle and safety drop-outs. To remove the wheel, the cam is loosened, washer (8) is rotated to maximize clearance, then the slide is pulled away from the drop-out against a spring. In all embodiments, no tools are needed to quickly remove or re-attach the axle to the drop-outs, and no readjustment of cam tension is needed as with current quick-release adjustment nuts. The safety interlock slide (60) and the two-position washer 8 may be combined as two-position safety interlock slide (70).

18 Claims, 12 Drawing Sheets

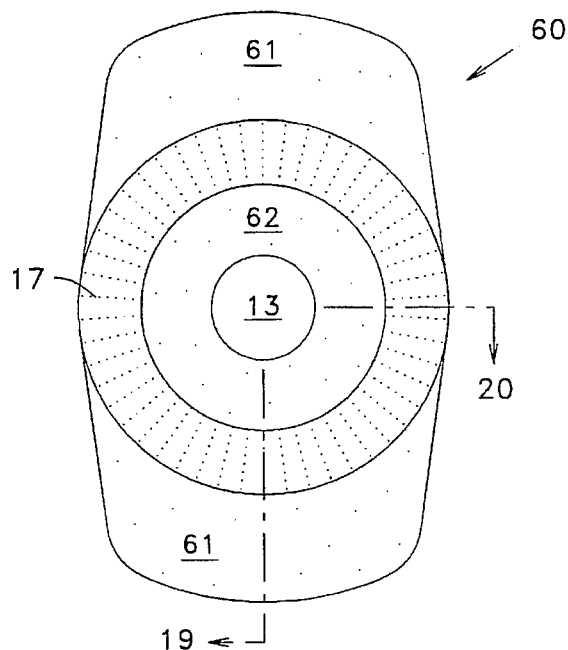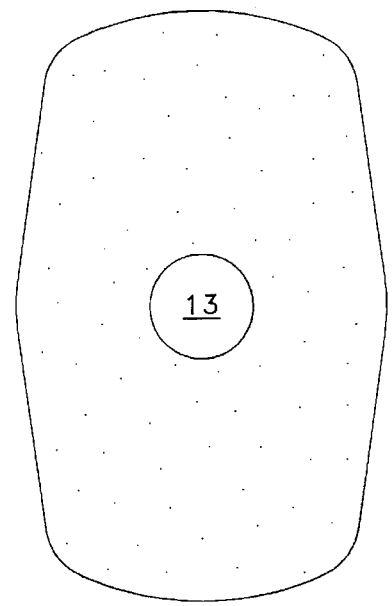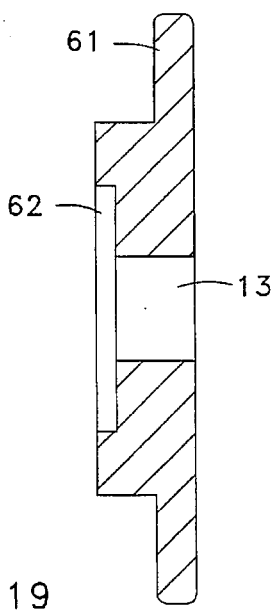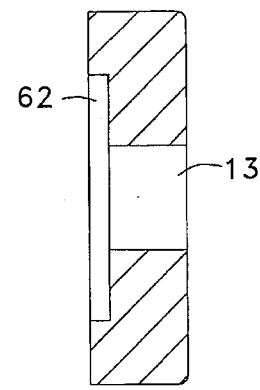

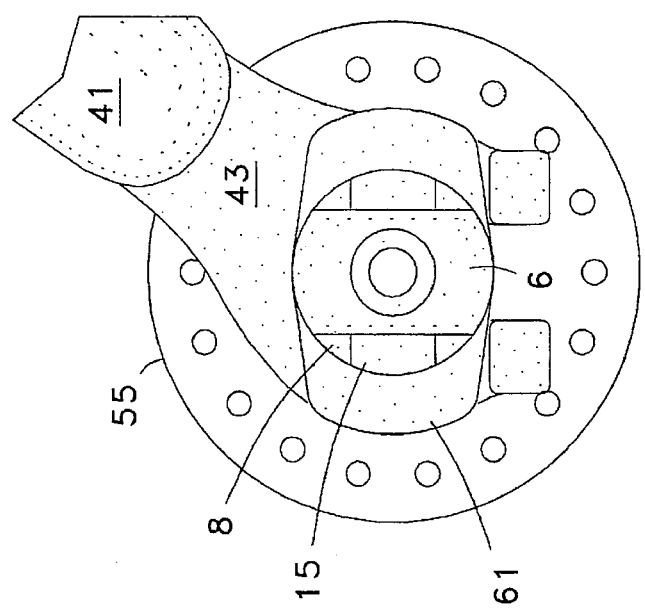
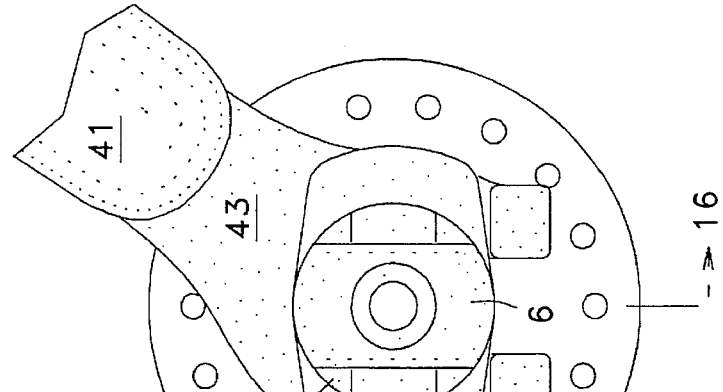
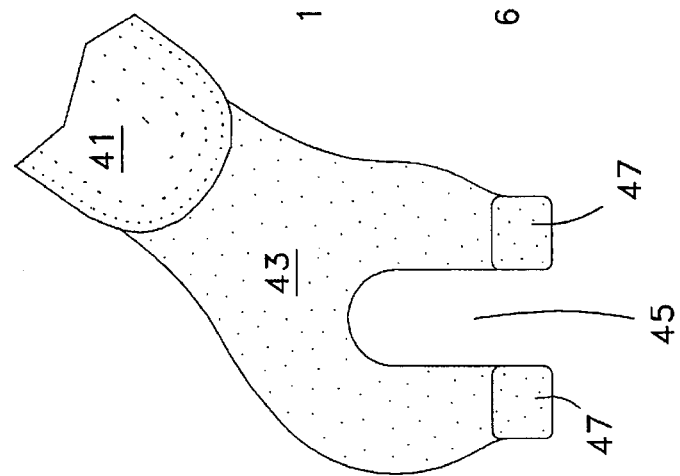

QUICK-RELEASE BICYCLE AXLE FASTENER NUT

RELATED PATENT APPLICATIONS

Embodiment 1 of the present application is disclosed in provisional patent application Ser. No. 60/003,405, filed Sep. 8, 1995 by Cal M. Phillips, which is claimed as the priority date for embodiment 1 herein. Embodiments 2 and 3 herein are related to both the provisional patent application above, and to patent application Ser. No. 08/494,031, filed Jun. 26, 1995, now U.S. Pat. No. 5,567,020, by Cal M. Phillips and John V. Stewart (pending). Embodiments 2 and 3 are new combinations as of the present application, so their priority date is the filing date of the present application.

BACKGROUND

1. Field

This invention relates to cam-action quick-release bicycle axle fasteners.

2. Prior Art

Cam-action quick-release axle fasteners for bicycles have been available for years, but existing designs have inherent disadvantages. They can be misadjusted or left disengaged by the user, causing a wheel to wobble or detach while riding. To overcome this, hub makers designed drop-outs with outer surfaces having depressions, holes, or tabs, which engage a complementary portion of the fastener. This retains the axle despite a loose fastener cam. However, these safety devices reduce the convenience of standard quick-release fasteners, since the user must both release the cam and loosen its adjustment nut to release the axle. The nut must then be readjusted each time the axle is attached to the drop-out. Many users are not mechanically competent to perform this adjustment, resulting in a fastener that is dangerously loose or tight.

Numerous other efforts have been made to improve the safety of quick-release axle fasteners. Some of these are now described and contrasted with the present invention.

The quick-release hub of U.S. Pat. No. 4,400,038 (Hosokawa) has a safety mechanism which prevents axle release until the cam lever is fully rotated. However, in the partly rotated position, it is susceptible to release from impacts.

The quick-release hub of U.S. Pat. No. 4,964,287 (Gaul) uses a cam with a removable lever or key for security. The key or lever can be lost. The cam position is hidden, so the user could assume the cam is engaged when it is not. Gaul has no safety interlock. His lock-down washers 26,28 do not serve this function, since they do not hold the axle in the drop-out when the cam is released.

The quick-release hub of U.S. Pat. No. 4,805,941 (Segawa, FIGS. 4,5) offers a safety interlock. His clamping mechanism needs enough range to fully relax the spring 6 of the interlock, since no radial lip is provided for its disengagement from the drop-out with the fingers. Thus, his interlock is inactive when it is needed most, in the loose position of the cam lever. When partially rotated, his cam lever is releasable by impact or vibration, defeating the safety.

The quick-release hub of U.S. Pat. No. 4,805,941 (Downing) has a safety hook for holding the axle in the drop-out. However, it requires a specialized drop-out for the hook assembly, it can be released by impacts, it is vulnerable to damage, and engagement of the hook is optional.

OBJECTIVES and SUMMARY

Objectives

The objective of this invention is a simple, safe, convenient quick-release (QR) fastener for bicycle axles, having the following advantages:

1. Fast, safe wheel removal and attachment without tools.
2. No adjustments needed after initial assembly.
3. Wheel is quickly removed and mounted without QR adjustment.
4. Uses standard safety drop-outs.
5. A safety interlock that engages automatically during the single act of inserting the axle in the drop-out.

Summary

These objectives are met in the present invention. An improved tension adjustment nut of a cam/lever quick-release bicycle axle fastener has a washer 8 that provides two different thicknesses in two alternate rotational positions. Rotating this washer 90 degrees with the fingers, when the cam is loose, supplies a quick change in clearance between the washer and the drop-out, for removal or mounting of the axle. For axle mounting, clearance is reduced to a pre-set clamping position.

A safety interlock slide 60 is preferably added, for automatic, undefeatable, secondary engagement of the axle with safety drop-outs. To remove the wheel, the cam is loosened, washer 8 is rotated to maximize clearance, then the slide is pulled away from the drop-out against a spring. In all embodiments, no tools are needed to quickly remove or re-attach the axle to the drop-outs. The safety interlock slide 60 and the two-position washer 8 may be combined as two-position safety interlock slide 70.

This device is safer than current quick-release fasteners. It needs no adjustment after assembly, while current designs require readjustment each time a wheel is re-installed.

DRAWINGS

Figure 3:
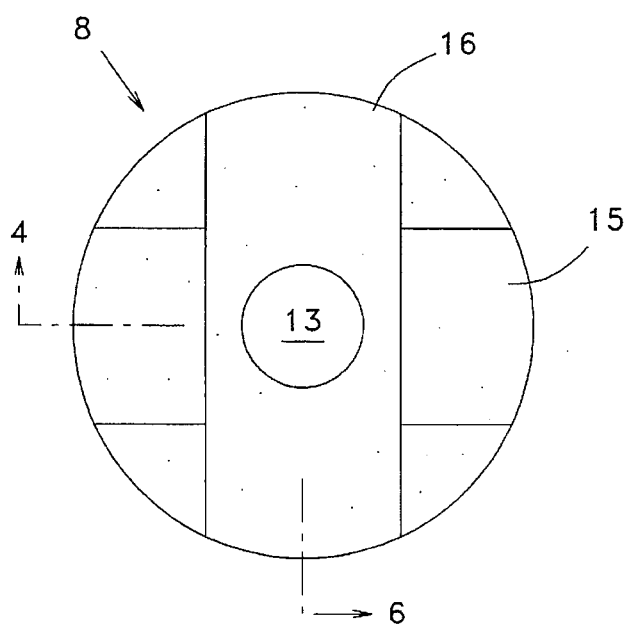

FIG. 3 Outer end of two-position washer 8.

Figure 4:
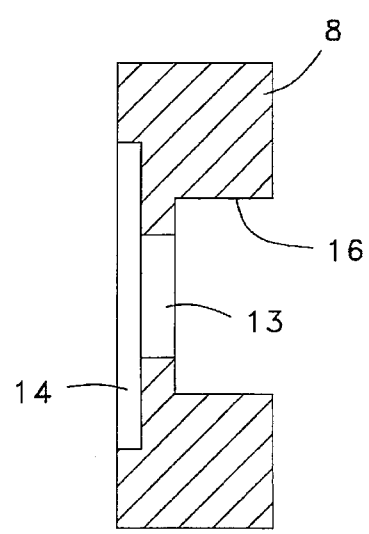

FIG. 4 Sectional view of washer 8 across deep groove 16.

Figure 5:
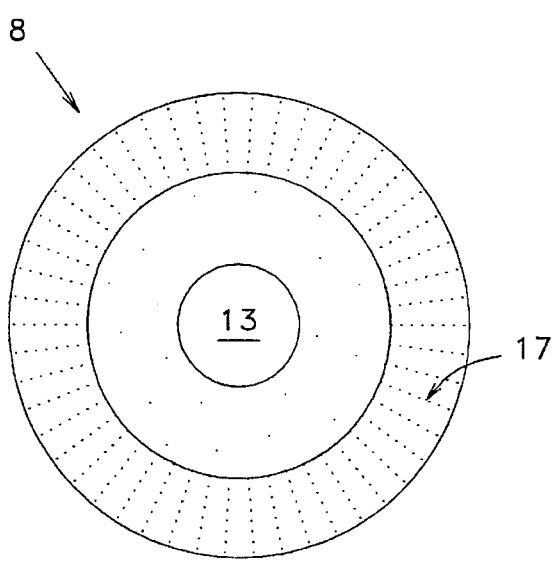

FIG. 5 Inner end of two-position washer 8.

Figure 6:
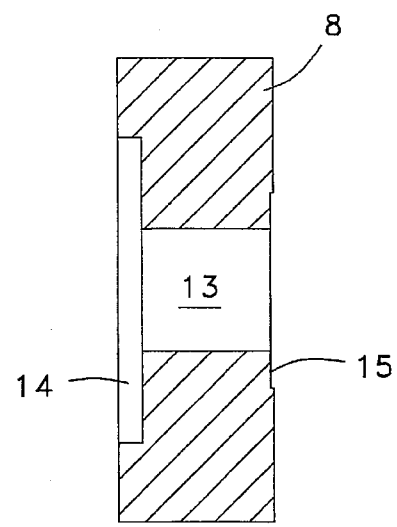

FIG. 6 Sectional view of washer 8 across shallow groove 15.

Figure 7:
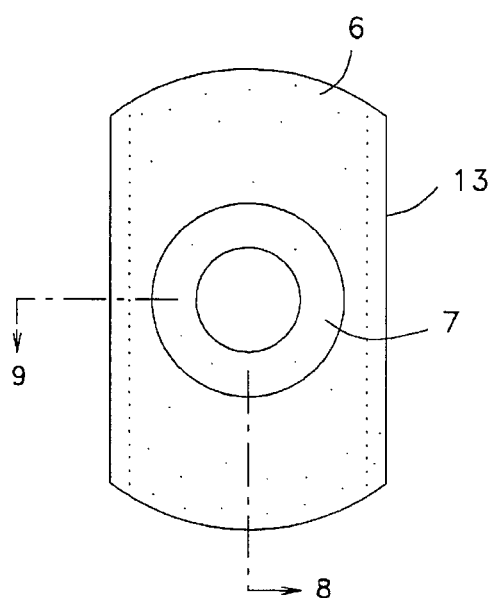

FIG. 7 Outer end of adjustment nut 6.

Figure 8:
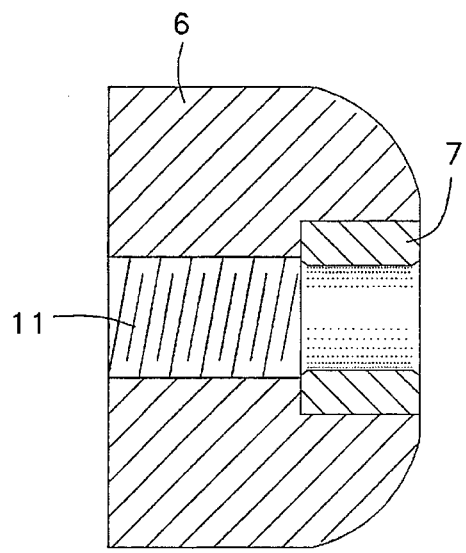

FIG. 8 Sectional view of adjustment nut 6 across maximum width.

Figure 9:
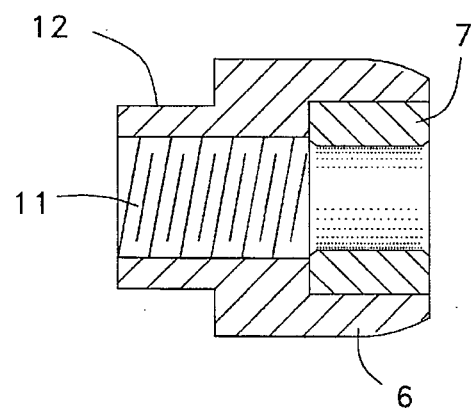

FIG. 9 Sectional view of adjustment nut 6 across minimum width.

Figure 10:
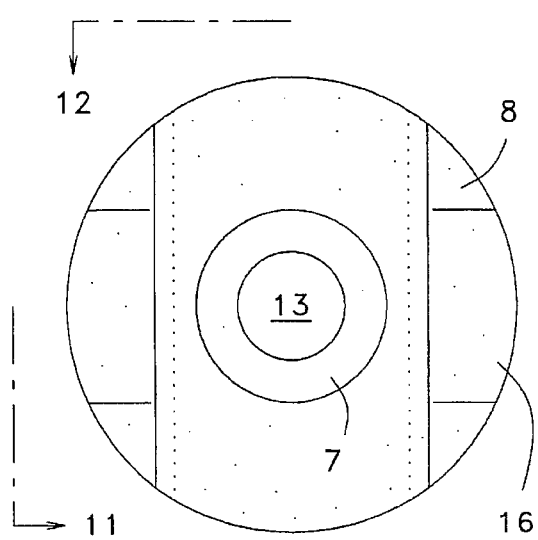

FIG. 10 Outer end of washer 6, adjustment nut 8, in locked position.

Figure 11:
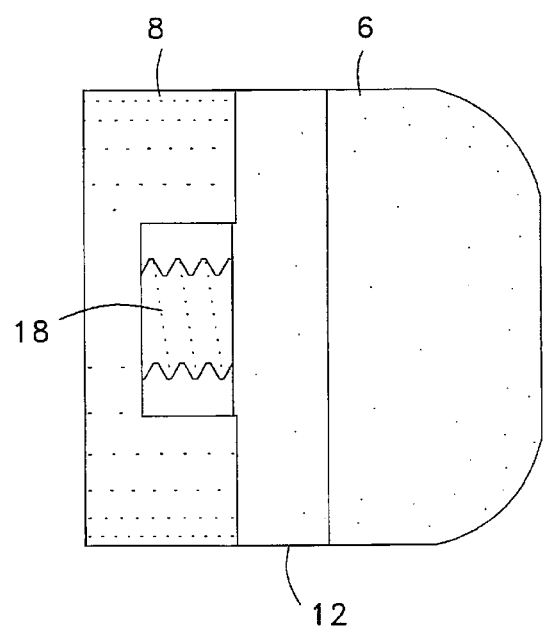

FIG. 11 Front view of FIG. 10.

Figure 12:
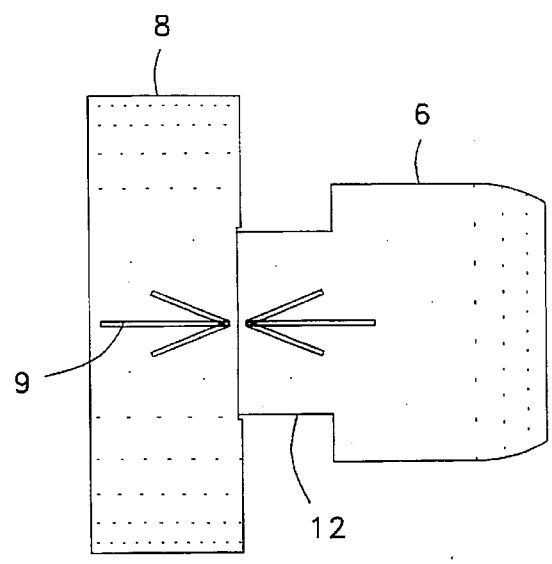

FIG. 12 Top view of FIG. 10.

Figure 13:
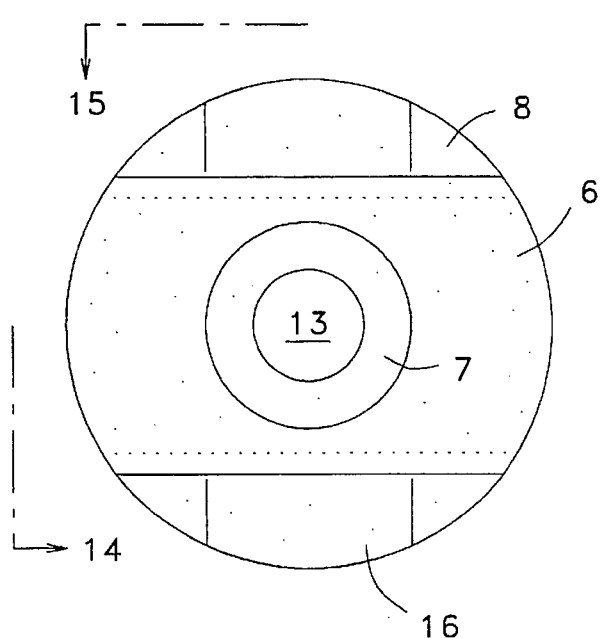

FIG. 13 Outer end of washer 6, adjustment nut 8, in loose position.

Figure 14:
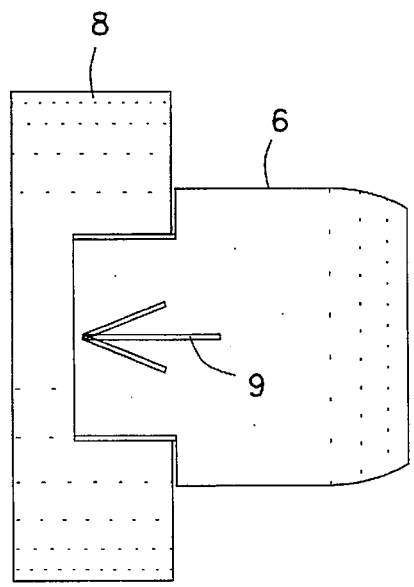

FIG. 14 Front view of FIG. 13.

Figure 15:
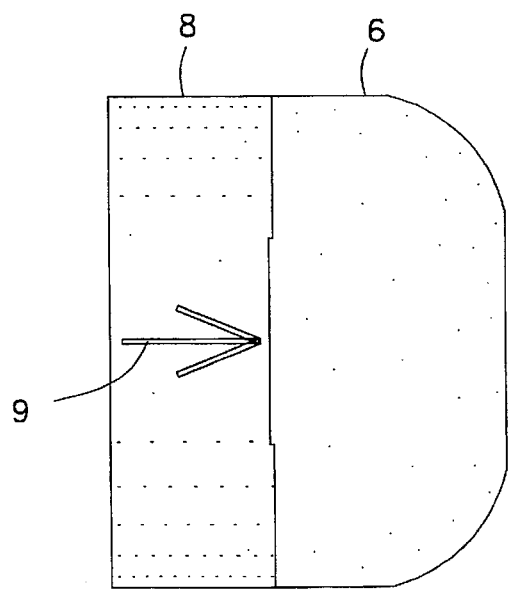

FIG. 15 Top view of FIG. 13.

Figure 16:
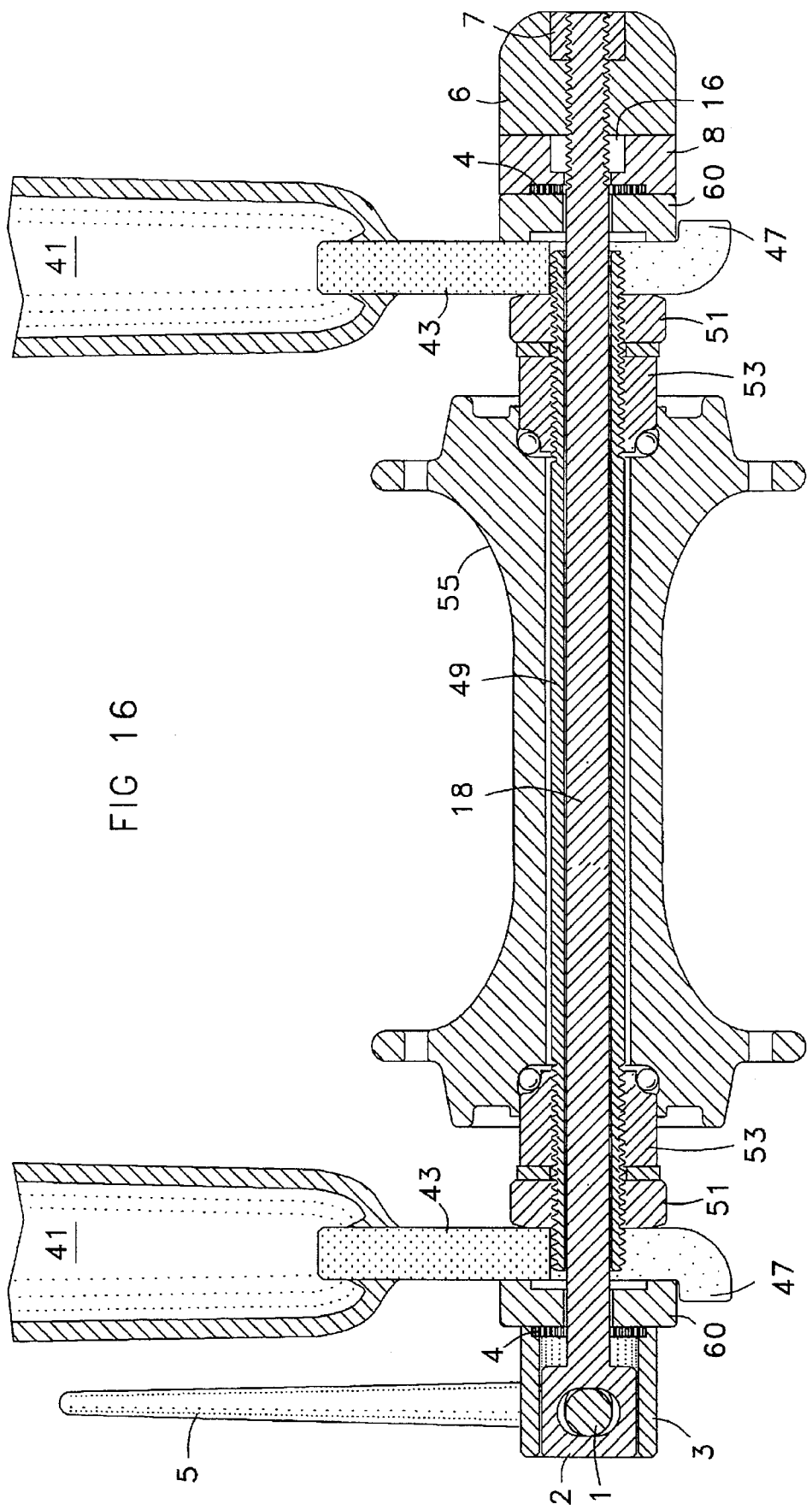

FIG. 16 Front sectional view of second embodiment of axle fastener, comprising the first embodiment, of FIGS. 1–15, plus safety interlock slides 60.

FIG. 17 Inner end of safety interlock slide 60.

FIG. 18 Outer end of safety interlock slide 60.

FIG. 19 Sectional view of safety interlock slide 60 as per FIG. 17.

FIG. 20 Sectional view of safety interlock slide 60 as per FIG. 17.

FIG. 21 Outer view of safety drop-out.

FIG. 22 Right end view of embodiment 2 (FIG. 16), in locked position.

FIG. 23 Right end view of embodiment 2 in unlocked position (deep slot 16 is now hidden under adjustment nut 8).

Figure 24:
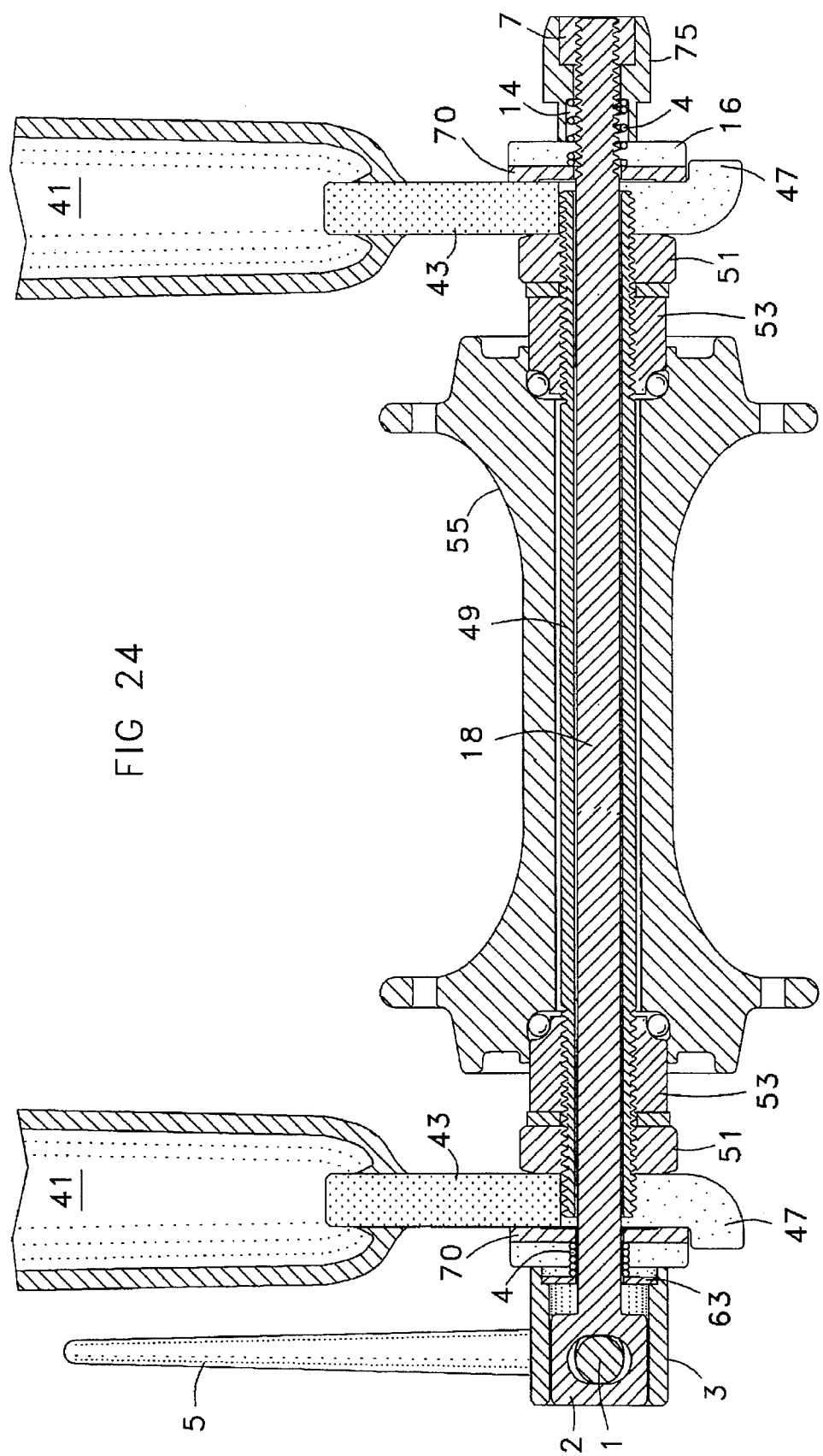

FIG. 24 Front sectional view of third embodiment of axle fastener using two-position safety interlock slides 70.

Figure 25:
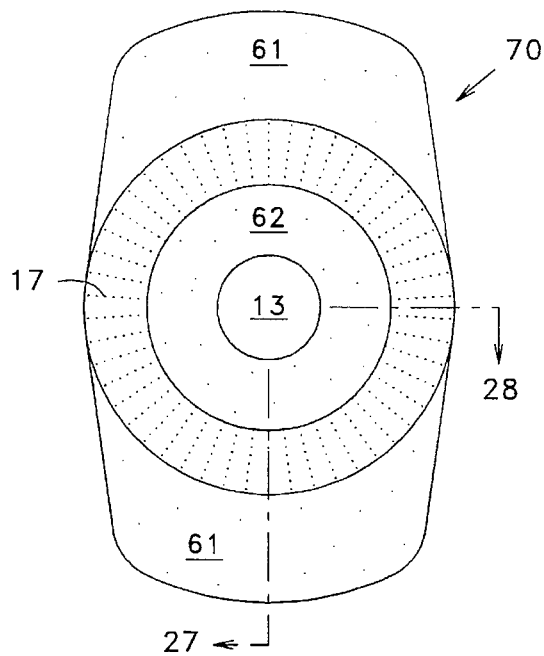

FIG. 25 Inner end of two-position safety interlock slide 70.

Figure 26:
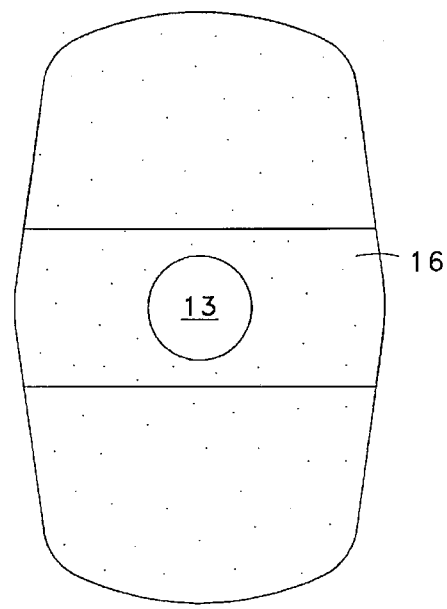

FIG. 26 Outer end of two-position safety interlock slide 70.

Figure 27:
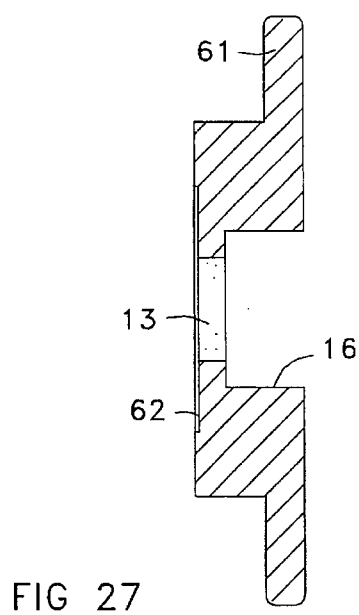

FIG. 27 Sectional view of safety interlock slide 70 as per FIG. 25.

Figure 28:
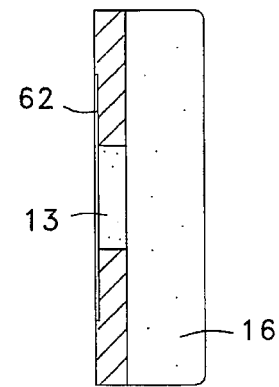

FIG. 28 Sectional view of safety interlock slide 70 as per FIG. 25.

Figure 29:
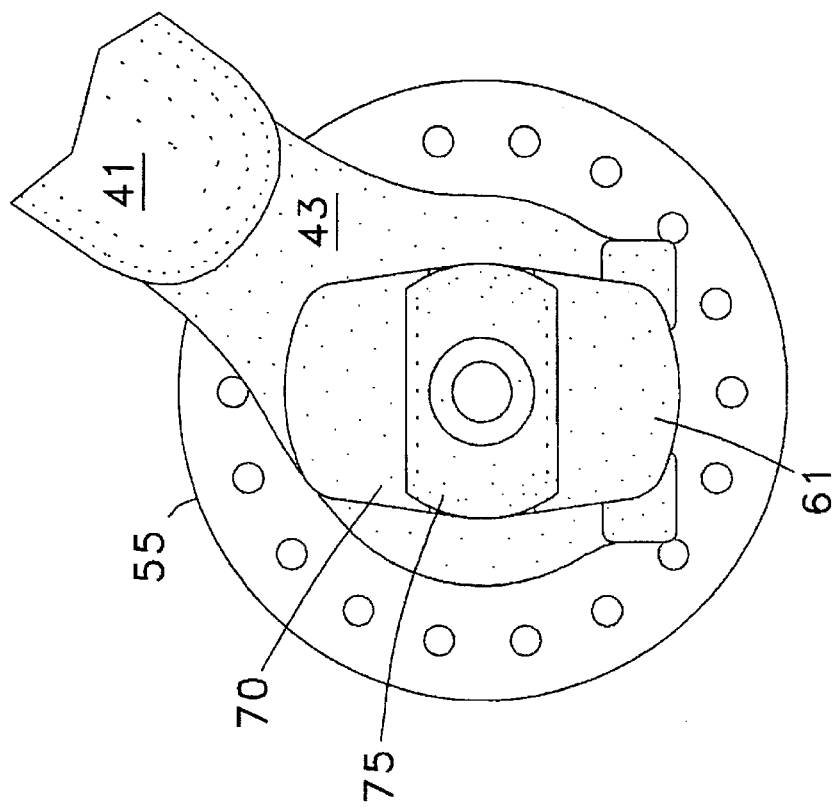

FIG. 29 Right end view of embodiment 3 (FIG. 24), in locked position.

Figure 30:
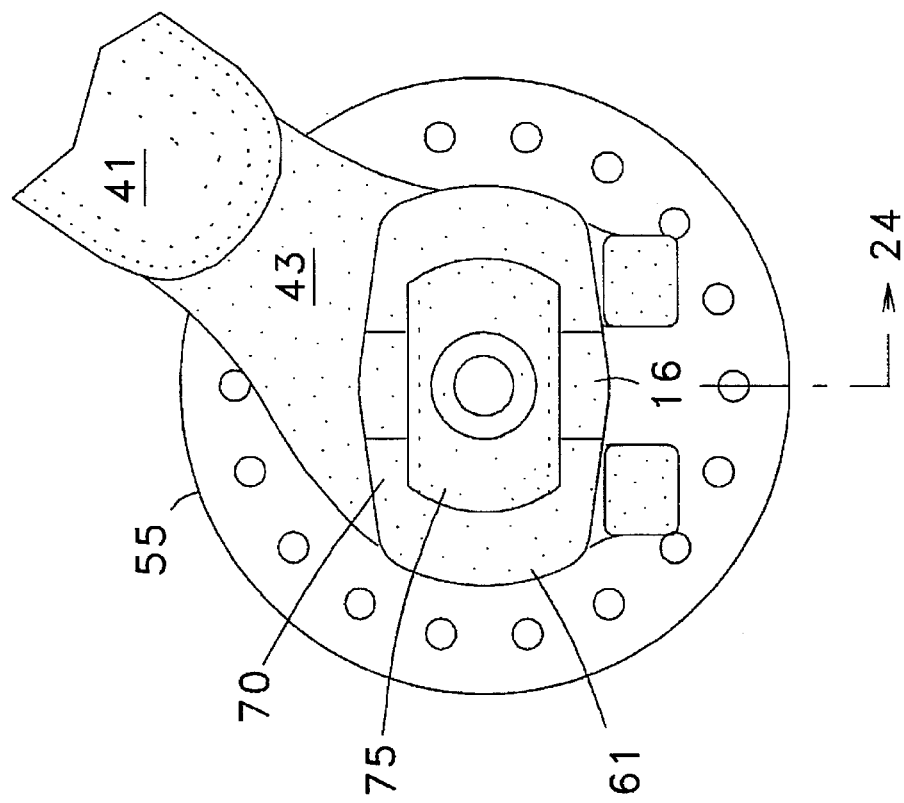

FIG. 30 Right end view of embodiment 3, in unlocked position.

REFERENCE NUMERALS

1. Cam
2. Cam-following head of skewer
3. Cam sleeve
4. Spring
5. Lever
6. Adjustment nut
7. Nylon insert
8. Two-position washer
9. Locked alignment indicators
11. Threads for skewer
12. Portion of nut which fits into slot 16.
13. Hole for skewer
14. Spring well
15. Shallow slot for tactile indication of locked position.
16. Deep slot for increased clearance, allowing release of axle.
17. Serrations for increased friction.
18. Control rod or skewer
41. Bicycle frame (fork or seat stay)
43. Drop-out
45. Open-ended slot
47. Safety tab or other coupling surface on drop-out
49. Axle
51. Jam nut
53. Bearing cone
55. Hub
60. Safety interlock slide
61. Finger tab
62. Optional depression for increased friction
63. Flat washer
70. Two-position safety interlock slide
75. Adjustment nut with spring well 80. Action arrows showing relative movement of parts

| TERMINOLOGY | |
|---|---|
| cam | A mechanical component with a pivot axis, having a working surface that is eccentric or smoothly varying in radial distance from said axis. |
| cam lever | An operating lever attached to a cam. |
| diametrical | Along a diameter centered on, and perpendicular to, the axis of the control rod. |
| drop-out | A plate attached to the fork or frame of a velocipede, the plate having an open-ended slot for mounting a wheel axle therein. |
| inboard | Relatively closer laterally to the middle of the axle. |
| outboard | Relatively further laterally from the middle of the axle. |
| outer | Laterally farthest from the middle of the axle. |
| outward | In a direction laterally away from the middle of the axle. |
| radial | Perpendicular to the axis of the control rod. |
| right, left | Relative to a view at the front of the bicycle, not the rider. |
| safety drop-out | A drop-out having on its outer surface a protrusion, depression, or hole, that engages a complementary portion of the axle fastener to retain the axle in a back-up, or secondary, mode when the primary fastener mechanism is loose or disengaged. |
| velocipede | A human-powered wheeled vehicle. |

DESCRIPTION

Figure 1:
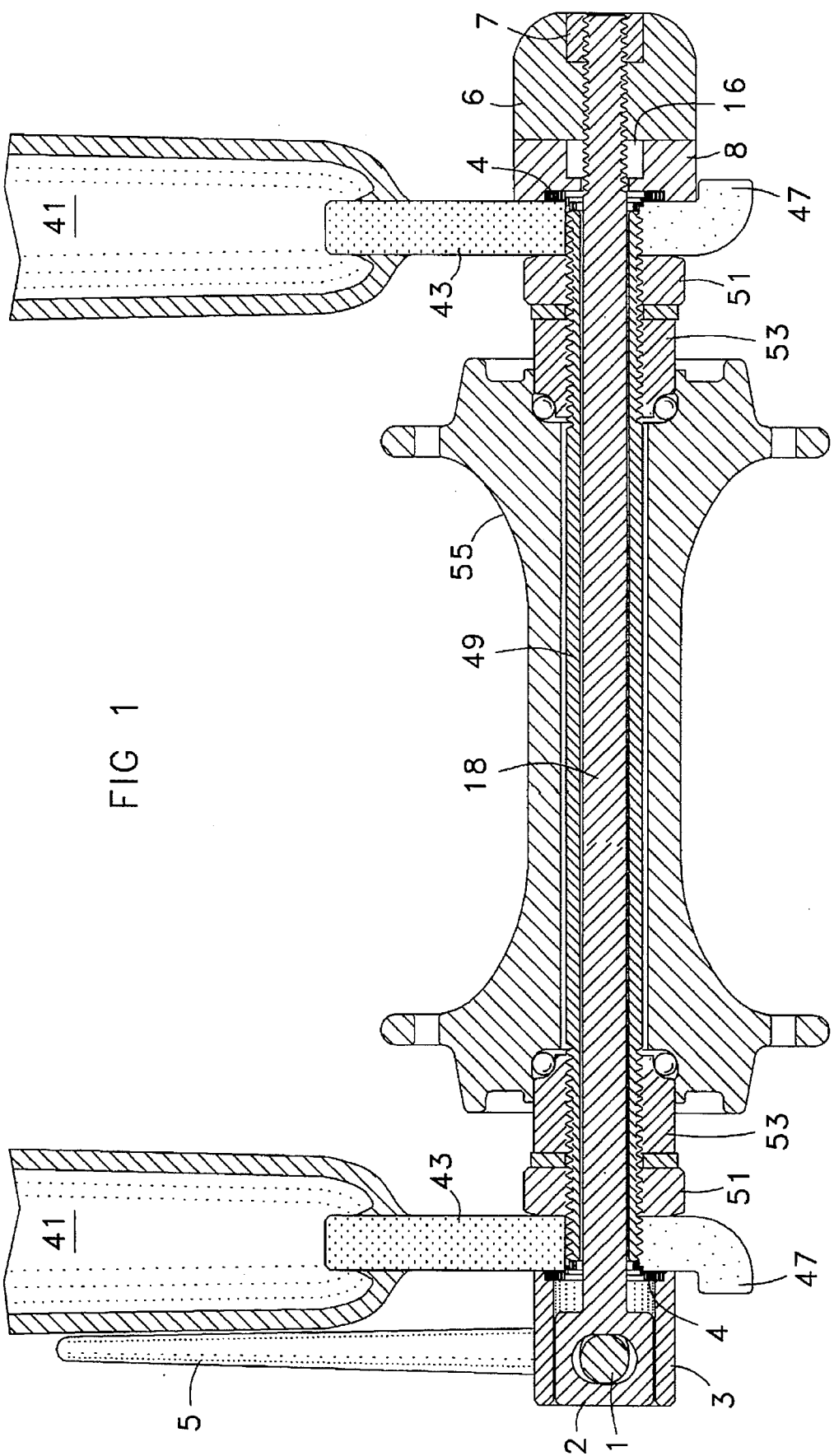
FIG. 1 Shows a front sectional view of mounted wheel axle.
Figure 2:
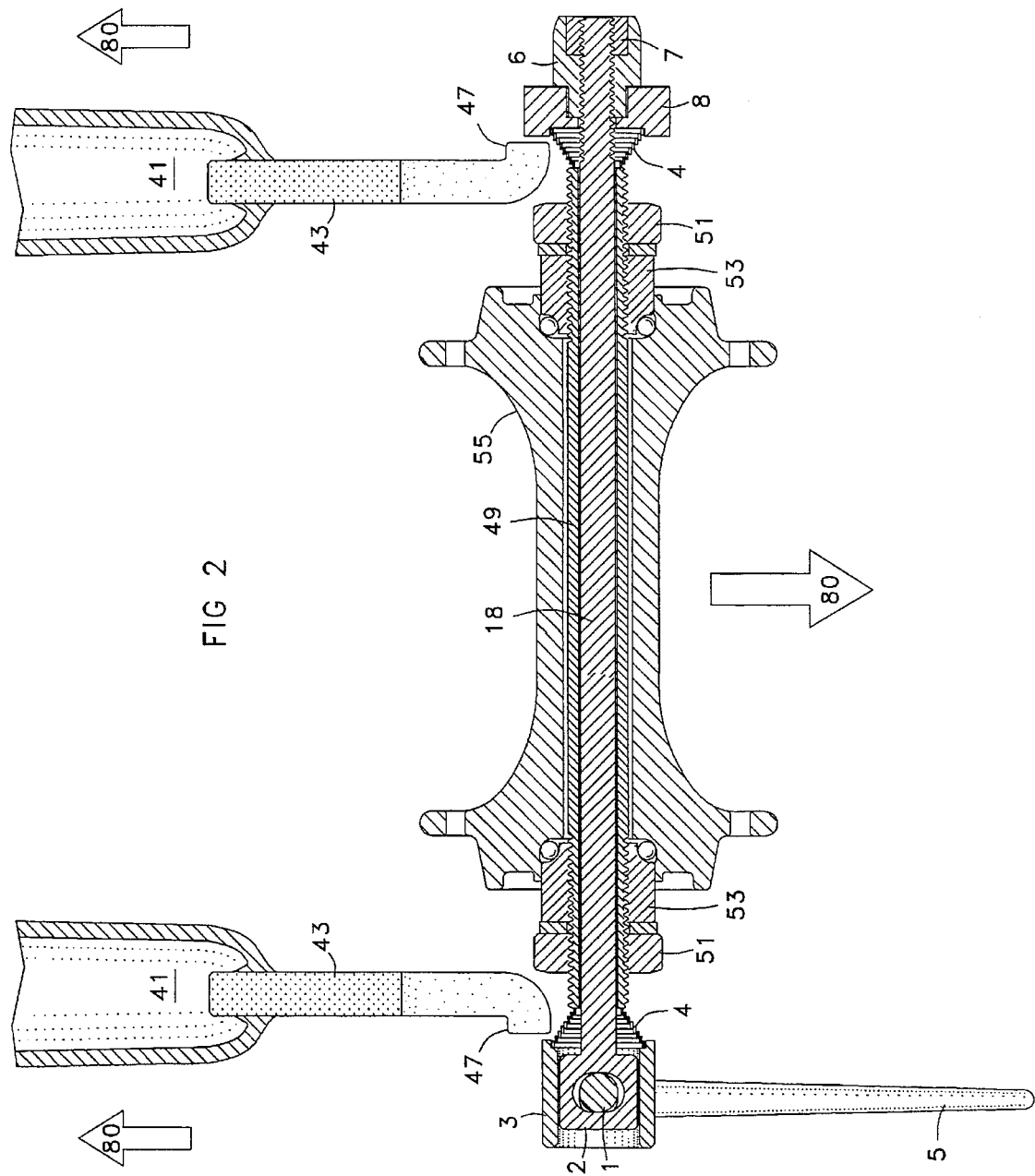
FIG. 2 Shows the view of FIG. 1 with axle fastener loose.

Referring to FIG. 1: A control rod or skewer 18 passes through a hollow axle 49. Attached to one end of the skewer is a standard cam/lever quick-release fastener (at left in drawing). Attached to the other end of the skewer is an adjustment nut 6. Between nut 6 and the drop-out 43 is a two-position washer 8. In one position, nut 6 is held farther away from the drop-out (FIGS. 1, and 10–12). This is called the locked position. In this position, closing the cam lever (FIG. 1) clamps the drop-outs tightly on each side. The locked position has tactile indication when the adjustment nut 6 clicks into shallow groove 15 during rotation of the adjustment nut with the fingers.

Proper clamping tension is set via the adjustment nut 6. This is done with the alignment arrows 9 aligned, and the axle in the drop-out, by testing the closing force of lever 5, and rotating adjustment nut 6 until proper force is obtained, as with existing instructions for current cam/lever quick-release fasteners. The setting is held by the friction of a nylon insert 7 or other thread locking means. Unlike existing quick-release fasteners, subsequent wheel removal and re-mounting does not require re-adjustment of nut 6, because the two-position washer 8 provides adequate clearance for wheel removal past the safety tabs 47 without loosening the adjustment nut.

A second embodiment, shown in FIGS. 16–23, is the same as the first embodiment of FIGS. 1–15, with the addition of one or two safety interlock slides 60, mounted on either or both ends of the axle as shown. On the end with the adjustment nut 6, the slide is mounted inboard of the two-position washer 8. Here, the spring 4 serves double duty. It urges the two-position washer 8 outward against the adjustment nut, as in the first embodiment, and it urges the slide 60 inward against the safety drop-out. The slide 60 engages the coupling surface 47 of the drop-out when the axle is inserted in the drop-out. The spring maintains this engagement even in the loose positions of both the cam and the two-position washer. This prevents accidental disengagement of the axle under all conditions. Removal of the axle requires opening of the cam lever, turning the two-position washer to the loose position, in which slot 16 slips over the inner end of adjustment nut 6, and finally, pulling outward on the safety slides 60 with the fingers, via finger tabs 61. The slides then clear the coupling surfaces 47 allowing removal of the axle from the drop-outs. Engagement of the safety slides 60 with safety drop-outs is automatic and undefeatable, yet wheel removal without tools is easily performed. FIGS. 22 and 23 appear the same, but washer 8 has been rotated 90 degrees, interchanging the positions of the deep slot 16 and the shallow slot 15. A third embodiment, shown in FIGS. 24–30, is similar to the second embodiment of FIGS. 16–23. The functions of the safety interlock slide 60 and the two-position washer 8 are combined in a single part—a two-position safety-interlock slide 70. Spring 4 urges slide 70 inward against the drop-out, where it performs the same automatic safety function as in the second embodiment. Slide 70 has a deep slot 16 in its outer surface. To remove the wheel, the user aligns this deep slot 16 with adjustment nut 75, then pulls slide 70 outward with the fingers. The slot 16 slips over the inner end of the adjustment nut 75, providing clearance between the inner end of slide 70 and the coupling surface 47. A spring well 14 is provided in the adjustment nut 75, as shown. On the cam end of the axle, a safety-interlock slide is preferred but optional. It may be of type 70 or 60. Slot 16 on this side serves only as a spring well, and allows use of the same spring design 4 on both sides, in conjunction with a flat washer 63. If slide type 60 is used here, a conical spring is used in the well of the cam sleeve 3, as shown in the second embodiment. FIGS. 29 and 30 show the locked and loose positions respectively of the two-position safety interlock slide 70. In slide 70, the deep groove 16 may be oriented transversely to the finger tabs as shown, or in line with them. The finger tabs 61 may form a continuous radial ring, as in the related invention (first paragraph herein).

The orientation of the adjustment nut (8 or 75) may vary from the examples shown, since the nut is turned for adjustment during initial installation of the axle. The two-position washer 8, or two-position safety interlock slide 70, is oriented in relation to the adjustment nut 8 or 75 respectively. For clarity of the drawings, the cam lever is shown rotating in a vertical plane. However, this is not necessary. Such levers are often rotated in a horizontal plane, and are locked pointing rearward.

Any of the embodiments could be designed with more than two effective rotational positions of the washer. For example a triangular inner end of the nut, and matching triangular depression in the outer surface of the washer could be provided. However, this is not recommended.

PREFERRED EMBODIMENT

The preferred embodiment is embodiment 2, with two safety interlock slides 60, as shown in FIGS. 16–23.

OPERATION OF PREFERRED EMBODIMENT

Wheel Removal:

1. Rotate the cam lever to the loose position.

2. Rotate washer 8 with the fingers until deep slot 16 slips over the inner end of adjustment nut 6 (FIG. 14).

3. While holding the safety interlock slides 60 outward with the fingers, remove the axle from the drop-out.

Wheel Installation:

1. With the cam lever loose, and nut 6 in deep slot 16 (FIG. 14), hold the safety interlock slides 60 outward with the fingers, and slide the axle into drop-outs.

2. Rotate washer 8 with the fingers 90 degrees until the locked position indicator arrows 9 are aligned (FIG. 12)

3. Rotate the cam lever to the locked position.

SCOPE

The description and drawings illustrate examples of the invention. The invention is not limited to these examples, and modifications may be made therein without departing from the concept and scope of the invention, which is defined by the following claims.

I claim:

1. An adjustment retention device for a cam-tensioned control rod in a quick-release velocipede axle fastener, comprising:

a hollow velocipede axle having two ends;

a control rod passing through the hollow axle, having a lever-operated cam tensioner on one end, and external threads on the other end;

an internally threaded nut on the threaded end of the control rod, the nut having an inner end;

a washer slidably mounted on the control rod inboard of the nut;

the inner end of the nut and the outer surface of the washer being keyed to each other, so that in at least one rotational relationship they mate, but in at least one other rotational relationship, they do not mate;

whereby the washer provides, in alternate rotational positions, two effective thicknesses.

2. The adjustment retention device of claim 1, in which the inner end of the nut and the outer surface of the washer are additionally keyed in a second rotational relationship so that said one relationship and said second relationship provide mating of the washer and nut at two different depths.

3. The adjustment retention device of claim 1, further comprising a compression spring mounted around the control rod, between the washer and the nearest end of the axle, to urge the washer outward against the nut.

4. The adjustment retention device of claim 1, further comprising alignment indicators on the washer and nut, which align with each other when the washer and nut are in said other rotational relationship.

5. The adjustment retention device of claim 1, further comprising a safety interlock slide, slidably mounted on the control rod inboard of the washer, and a compression spring between the slide and the washer, urging the slide inward and the washer outward.

6. The adjustment retention device of claim 1, further comprising radial finger tabs on the washer, and a compression spring between the washer and nut, urging the washer inward.

7. A tension adjustment and retention device for a cam-tensioned control rod in a quick-release velocipede axle fastener, comprising:

a hollow velocipede axle having two ends;

a control rod passing through the hollow axle, having a lever-operated cam tensioner on one end, and external threads on the other end;

an internally threaded nut on the threaded end of the control rod, the nut having a diametrically oblong inner end;

a washer slidably mounted on the control rod inboard of the nut, having an outer surface with a depression that matches the inner end of the nut, and mates with it in at least one rotational relationship, but rejects the inner end of the nut in at least one other rotational relationship;

whereby the washer provides, in two alternate rotational positions, two effective thicknesses.

8. The tension adjustment and retention device of claim 7, in which the outer surface of the washer has a second, shallower depression, which mates with the inner end of the nut in a second rotational relationship, so that said one relationship and said second relationship provide mating between the washer and nut at two different depths.

9. The tension adjustment and retention device of claim 7, further comprising a compression spring mounted around the control rod, between the washer and the nearest end of the axle, to urge the washer outward against the nut.

10. The tension adjustment and retention device of claim 7, further comprising alignment indicators on the washer and nut, which align with each other when the washer and nut are in said other rotational relationship.

11. The tension adjustment and retention device of claim 7, further comprising a safety interlock slide, slidably mounted on the control rod inboard of the washer, and a compression spring between the slide and the washer, urging the slide inward and the washer outward.

12. The tension adjustment and retention device of claim 7, further comprising radial finger tabs on the washer, and a compression spring between the washer and nut, urging the washer inward.

13. An improved adjustment nut for a quick-release velocipede axle fastener of the type having a control rod passing through a hollow axle having two ends, the control rod having a lever-operated cam on one end and external threads on the other end, the axle mounted between two drop-outs on a velocipede, each drop-out having an outer surface, the improved adjustment nut comprising:

an internally threaded nut on the threaded end of the control rod, the nut having a diametrically elongated inner end;

a washer slidably mounted on the control rod inboard of the nut, having an outer surface with a first slot that fits over the inner end of the nut when the first slot is aligned with the inner end of the nut, but when the first slot and nut are not so aligned, the outermost surface of the washer contacts the innermost surface of the nut and holds it out of the first slot;

whereby the washer provides, in two alternate rotational positions, two effective thicknesses, supplying a quick increase of clearance between the inner surface of the washer and the outer surface of the drop-out upon rotating the washer to a position in which the slot is aligned with the inner end of the nut, and providing a quick return to an original adjustment upon rotating the washer to a non-aligned position.

14. The adjustment nut of claim 13, in which the outer surface of the washer has a second, shallower slot, transverse to the first slot, which fits partly over the inner end of the nut when the washer is rotated about 90 degrees from alignment of the first slot with the inner end of the nut, whereby the fastener-locking position of the washer is felt as a detent by the user.

15. The adjustment nut of claim 13, further comprising a compression spring mounted around the control rod, between the washer and the nearest end of the axle, to urge the washer outward against the nut.

16. The adjustment nut of claim 13, further comprising alignment indicators on the washer and nut, which align with each other when the first slot is approximately transverse with the elongated inner end of the nut.

17. The adjustment nut of claim 13, further comprising a safety interlock slide, slidably mounted on the control rod inboard of the washer, and a compression spring between the slide and the washer, urging the slide inward and the washer outward.

18. The adjustment nut of claim 13, further comprising radial finger tabs on the washer, and a compression spring between the washer and nut, urging the washer inward.

* * * * *